US012785892B2

(12) United States Patent
Vijayan et al.

(10) Patent No.: US 12,785,892 B2
(45) Date of Patent: Nov. 3, 2026

(54) METHOD AND SYSTEM FOR SUB-BAND USER CORRELATION BASED ON SOUNDING REFERENCE SIGNAL FOR MULTIPLE SOUNDING REFERENCE SIGNAL GROUPS IN MASSIVE MIMO RADIO ACCESS NETWORKS

(71) Applicant: Mavenir Systems, Inc., Richardson, TX (US)

(72) Inventors: Logeshwaran Vijayan, Bangalore (IN); Nithin Kumar, Bengaluru (IN); Young-Han Nam, Plano, TX (US)

(73) Assignee: Mavenir Systems, Inc., Richardson, TX (US)

( * ) Notice: Subject to any disclaimer, the term of this patent is extended or adjusted under 35 U.S.C. 154(b) by 392 days.

(21) Appl. No.: 18/449,955

(22) Filed: Aug. 15, 2023

(65) Prior Publication Data

US 2024/0072967 A1 Feb. 29, 2024

(30) Foreign Application Priority Data

Aug. 25, 2022 (IN) ............................. 202221048610

(51) Int. Cl.

| | |
|---|---|
| ***H04L 5/00*** | (2006.01) |
| ***H04L 25/02*** | (2006.01) |
| *H04B 7/0413* | (2017.01) |

(52) U.S. Cl.

CPC .......... *H04L 5/0051* (2013.01); *H04L 5/0044* (2013.01); *H04L 5/0094* (2013.01); *H04L 25/0224* (2013.01); *H04B 7/0413* (2013.01)

(58) Field of Classification Search

None

See application file for complete search history.

(56) References Cited

U.S. PATENT DOCUMENTS

2018/0279229 A1* 9/2018 Dinan ............... H04W 74/0833
2020/0196316 A1* 6/2020 Zhang ................... H04L 1/1614
2022/0052881 A1* 2/2022 Guo ..................... H04J 11/0046
2022/0352948 A1* 11/2022 Manolakos ......... H04L 25/0226
2023/0075495 A1* 3/2023 Goyal ................. H04W 56/002
2023/0189317 A1* 6/2023 Narasimha Swamy ..................... G06N 3/044 370/329
2023/0232255 A1* 7/2023 Charipadi ........... H04L 41/5009 370/216

OTHER PUBLICATIONS

Small Cell Forum, "Document 082.09.05, FAPI and nFAPI specifications", May 2017, Small Cell Forum, pp. 1-335 (Year: 2017).*
Small Cell Forum "Document 082.09.05 FAPI and nFAPI Specifications" May 19, 2017, Small Cell Forum Release 9.0.

(Continued)

*Primary Examiner* — Steve R Young

(74) *Attorney, Agent, or Firm* — Ruggiero McAllister & McMahon LLC

(57) ABSTRACT

System and methods for implementations of sub-band correlation computation among all scheduled users to efficiently pair users across any group of Physical Resource Blocks.

19 Claims, 3 Drawing Sheets

(56) References Cited

OTHER PUBLICATIONS

Moderator (China Telecom): "Email discussion summary for [98-bis-e] [323] NR_perf_enh2_Demod_Part 1", [Online](Apr. 14, 2021); 3GPP Draft; R4-2105994, 3rd Generation Partnership Project (3GPP), Mobile Competence Centre; 650, Route Des Lucioles; F-06921; Sophia-Antipolis Cedex; France.
Extended European Search Report for corresponding European Application EP 23 19 2921, 8 pages, dated Feb. 5, 2024.
Small Cell Forum "5G FAPI: PHY API Specification Document 222.10.04" Small Cell Forum, Nov. 2021.
International Patent Application No. PCT/CN2022/078545 for "Method and Interface for Information Interaction in O-RAN" filed on Mar. 1, 2022.

* cited by examiner

METHOD AND SYSTEM FOR SUB-BAND USER CORRELATION BASED ON SOUNDING REFERENCE SIGNAL FOR MULTIPLE SOUNDING REFERENCE SIGNAL GROUPS IN MASSIVE MIMO RADIO ACCESS NETWORKS

CROSS REFERENCE TO RELATED APPLICATIONS

This application is a U.S. patent application claiming foreign priority to Indian Patent Application No. 202221048610 having a filing date of Aug. 25, 2022, the entirety of which is incorporated herein by reference.

BACKGROUND OF THE DISCLOSURE a. Field of the Disclosure

The present disclosure relates to systems and methods for radio access networks. The present disclosure focuses on the design of operation, administration and management of various network elements of 4G and 5G based mobile networks.

a. Description of the Related Art

Open-Radio Access Network (O-RAN) Alliance is a group that defines the specification for the next generation RAN solutions comprising of the interface between the various RAN components such as O-RAN DU, O-RAN CU, O-RAN RU and the RIC based on lower layer split (LLS).

Virtualized RAN (vRAN) and Cloud RAN refers to an implementation of the RAN which virtualizes network functions in software platforms based on general purpose processors and moving some of the components to cloud server.

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the remote radio unit (RRU).

For the RRU and DU to communicate, an interface called the fronthaul is provided. 3rd Generation Partnership Project (3GPP) has defined 8 options for the split between the BBU and the RRU among different layers of the protocol stack. There are multiple factors affecting the selection of the fronthaul split option such as bandwidth, latency, implementation cost, virtualization benefits, complexity of the fronthaul interface, expansion flexibility, computing power, and memory requirement.

The 5G Functional Application Platform Interface (FAPI) is an initiative within the small cell industry released by the Small Cell Forum (SCF), which establishes interoperability and innovation among suppliers of platform hardware, platform software and application software. It does so by providing a common API around which suppliers can create a competitive ecosystem. In the O-RAN architecture, 5G FAPI connects the O-DU PHY, i.e., Layer-1 (L1), and Medium Access Control (MAC), i.e., Layer-2 (L2).

Massive MIMO (massive multiple-input multiple-output) is a type of wireless communications technology in which base stations are equipped with a very large number of antenna elements to improve spectral and energy efficiency. Using spatial multiplexing with MU-MIMO (Multi-User MIMO), 5G New Radio (NR) systems can simultaneously communicate with multiple user equipment (UEs) using the same time-frequency resources.

In multi-user MIMO, different streams produced using combination of different antennas are focused to different users or subscribers. Moreover, one stream can serve more than one user or subscriber.

SUMMARY OF THE DISCLOSURE

Described in the present disclosure are implementations of Sub-band correlation computation among all the scheduled users to efficiently pair users across any group of PRBs. Another aspect of the disclosure is to accommodate more RRC connected users and to provide correlation matrix for all users.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference can be configured to be made to the following Detailed Description, which is to be read in association with the accompanying drawings.

DETAILED DESCRIPTION OF THE EMBODIMENTS

Figure 1:
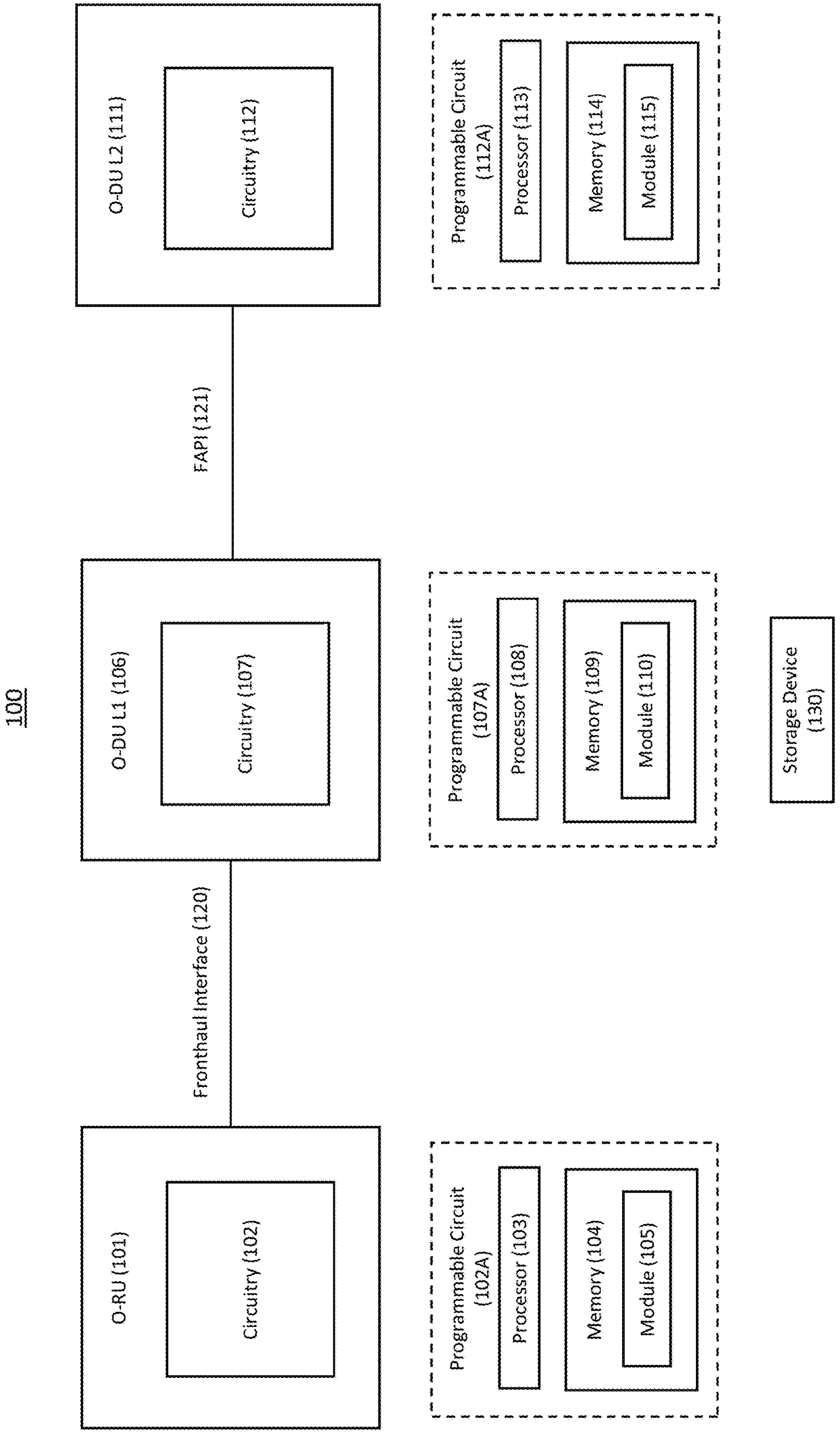
FIG. 1 shows modules in an O-RAN based network solution.

Various embodiments and implementations now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments and implementations set forth herein; rather, these embodiments and implementations are provided so that this disclosure will be thorough and complete, and will fully convey the scope of the embodiments and implementations to those skilled in the art. Among other things, the various embodiments and implementations can be methods, systems, media, or devices. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Reference is made to O-RAN Alliance, Small Cell Forum (SCF), Third Generation Partnership Project (3GPP) and the Internet Engineering Task Force (IETF) in accordance with embodiments of the present disclosure. The present disclosure employs abbreviations, terms and technology defined in accord with O-RAN Alliance (O-RAN), Third Generation Partnership Project (3GPP) and/or Internet Engineering Task Force (IETF) technology standards and papers, including the following standards and definitions. O-RAN, 3GPP, SCF and IETF technical specifications (TS), standards (including proposed standards), technical reports (TR) and other papers are incorporated by reference in their entirety hereby, define the related terms and architecture reference models that follow.

[1] SCF 222 5G FAPI: PHY API Specification 222.10.4 Nov. 2021.

[2] International Patent Application PCT/CN2022/078545 entitled "METHOD AND INTERFACE FOR INFORMATION INTERACTION IN O-RAN" filed on Mar. 1, 2022.

Abbreviations

FAPI—Functional Application Platform Interface
SCF—Small Cell Forum
RAN—Radio Access Network
RIC—RAN Intelligent Controller
RU—Radio Unit
CSI—Channel State Information
UL—Uplink
DL—Downlink
UE—User Equipment
PHY—Physical Layer
eNB—Evolved NodeB
MAC—Medium Access Control
TTI—Transmit Time Interval
CU—Centralized Unit
DU—Distributed Unit
SFN—System Frame Number
gNB—Next generation nodeB
PRB—Physical Resource Block
L1—Layer-1
L2—Layer-2
MIMO—Multiple Input Multiple Output
MU MIMO Multi-user, multiple-input, multiple-output technology
3GPP—3rd Generation Partnership Project
vRAN—Virtualized RAN
SRS—Sounding Reference Signal
TDD—Time Division Duplex The present disclosure provides embodiments of systems, devices and methods for Radio Access Networks and Cloud Radio Access Networks.

The functional application platform interface (FAPI) is an initiative in the Small Cell Forum (SCF) group that ensures inter-operability among 5G hardware, software and equipment vendors. The 5G FAPI: PHY API specification [1] defines the messages between the PHY and MAC layer.

In Massive MIMO RAN, higher spectral efficiencies are achieved by pairing multiple users into a MU MIMO group and letting the users share the same time frequency resources. Hence efficient pairing of these users becomes a problem. Generally, user pairing can be accomplished by multiple methods. One method is to compute a cross correlation between the SRS (channel estimates) of the users in the gNB and to pair users which are less correlated with others. This correlation is generally computed over the entire band occupied by the SRS transmission.

Using a single correlation metric across the entire band to categorize the UEs as correlated and non-correlated is less efficient since scheduling will happen over some set of PRBs in practical field deployments, and not over the entire bandwidth. Also, in the case of frequency selective channels, the correlation profile of the UEs can change significantly over the bandwidth. A single metric may not represent the correlation, resulting in sub-optimal MU MIMO performance.

Another aspect is that with a greater number of RRC connected users, the complexity of user correlation matrix computation increases as $O(n^2)$ which requires more CPU cycles.

Generally, a wideband correlation matrix is computed among users [2]. Accordingly, a single wideband correlation matrix is computed in L1 and shared with L2 as part of FAPI interface. This, however, is not sufficient to capture the correlation profile of the UEs across the entire band and results in sub-optimal MU MIMO performance.

Also, another related aspect is as RRC connected users increase, the computational complexity of the correlation matrix increases significantly. This increases CPU resources required. One way this is tackled is as by setting an upper bound on number of UEs beyond which the SRS resources are not assigned for the incoming UEs.

Described in the present disclosure are implementations of sub-band correlation computation among all scheduled users in a gNB to efficiently pair users across any group of PRBs. When a MU MIMO group is scheduled on a sub-band, the correlation matrix corresponding to that sub-band is used to pair users. This provides better performance compared to single wideband correlation matrix. The number of PRBs in each sub-band can be chosen as per 3GPP standard as a function of bandwidth. The number of PRBs in a sub-band can be flexibly chosen depending on the bandwidth available over the FAPI interface. The number of sub-bands over which correlation matrix is required can be indicated by a parameter in the FAPI message from an O-DU L2 layer (L2) to an O-DU L1 layer (L1).

Another aspect of the disclosure are implementations configured to accommodate more RRC connected users and to provide a correlation matrix for these users. This is achieved by scheduling SRS over first N RRC connected users and grouping them into a single SRS group over which correlation matrix is shared from L1 to L2. The users beyond N can be grouped together into another SRS group and scheduled into alternate SRS scheduling slots compared to 1st group and so on. The correlation matrix is computed over each group with a parameter in the FAPI interface indicating the group over which correlation is to be computed.

FIG. 1 is a block diagram of a system 100 that for an SCF FAPI between an O-DU L1 and an O-DU L2 for an O-RAN-based RAN. System 100 includes an O-RU 101, an O-DU L1 106, and an O-DU L2 111. The O-RU and O-DU L1 are communicatively coupled via a fronthaul interface 120, while the O-DU L1 and O-DU L2 are communicatively coupled via a 5G FAPI, referred to herein as FAPI 121. A variety of data is communicated via FAPI 121, including DL and UL U-plane data packets, DL and UL C-plane messages.

O-RU 101 includes electronic circuitry, namely circuitry 102, that performs operations on behalf of O-RU 101 to execute methods described herein. Circuitry 102 may be implemented with any or all of (a) discrete electronic components, (b) firmware, and (c) a programmable circuit 102A. O-RU 101 represents mainly an O-RAN-compliant O-RU which executes the lower physical layer blocks such as Fast Fourier Transform/Inverse Fast Fourier Transform (FFT/IFFT), Control Plane (CP) removal/addition, beamforming, analog to digital converter, digital to analog convertor, and Radio Frequency (RF) functions.

Programmable circuit 102A, which is an optional implementation of circuitry 102, includes a processor 103 and a memory 104. Processor 103 is an electronic device configured of logic circuitry that responds to and executes instructions. Memory 104 is a tangible, non-transitory, computer-readable storage device encoded with a computer program. In this regard, memory 104 stores data and instructions, i.e., program code, that are readable and executable by processor 103 for controlling operations of processor 103. Memory 104 may be implemented in a random-access memory (RAM), a hard drive, a read only memory (ROM), or a combination thereof. One of the components of memory 104 is a program module, namely module 105. Module 105 contains instructions for controlling processor 103 to execute operations described herein on behalf of O-RU 101.

O-DU L1 106 includes electronic circuitry, namely circuitry 107, that performs operations on behalf of O-DU L1 106 to execute methods described herein. Circuitry 107 may be implemented with any or all of (a) discrete electronic components, (b) firmware, and (c) a programmable circuit 107A. O-DU L1 106 represents the Layer-1 of an O-RAN compliant O-DU which executes functions such as higher physical layer (based on O-RAN split or similar lower layer splits). O-DU L1 106 can be implemented on proprietary hardware or COTS (commercial over the shelf servers) and it can be on the cloud.

Programmable circuit 107A, which is an optional implementation of circuitry 107, includes a processor 108 and a memory 109. Processor 108 is an electronic device configured of logic circuitry that responds to and executes instructions. Memory 109 is a tangible, non-transitory, computer-readable storage device encoded with a computer program. In this regard, memory 109 stores data and instructions, i.e., program code, that are readable and executable by processor 108 for controlling operations of processor 108. Memory 109 may be implemented in a random-access memory (RAM), a hard drive, a read only memory (ROM), or a combination thereof. One of the components of memory 109 is a program module, namely module 110. Module 110 contains instructions for controlling processor 108 to execute operations described herein on behalf of O-DU L1 106.

O-DU L2 111 includes electronic circuitry, namely circuitry 112, that performs operations on behalf of O-DU L2 111 to execute methods described herein. Circuitry 112 may be implemented with any or all of (a) discrete electronic components, (b) firmware, and (c) a programmable circuit 112A. O-DU L2 111 represents the Layer-2 of an O-RAN compliant O-DU which executes functions such as Medium Access Control (MAC), scheduler, and Radio Link Control (RLC). O-DU L2 111 can be implemented on proprietary hardware or COTS and it can be on the cloud.

Programmable circuit 112A, which is an optional implementation of circuitry 112, includes a processor 113 and a memory 114. Processor 113 is an electronic device configured of logic circuitry that responds to and executes instructions. Memory 114 is a tangible, non-transitory, computer-readable storage device encoded with a computer program. In this regard, memory 114 stores data and instructions, i.e., program code, that are readable and executable by processor 113 for controlling operations of processor 113. Memory 114 may be implemented in a random-access memory (RAM), a hard drive, a read only memory (ROM), or a combination thereof. One of the components of memory 114 is a program module, namely module 115. Module 115 contains instructions for controlling processor 113 to execute operations described herein on behalf of O-DU L2 111.

The term "module" is used herein to denote a functional operation that may be embodied either as a stand-alone component or as an integrated configuration of a plurality of subordinate components. Thus, each of modules 105, 110 and 115 may be implemented as a single module or as a plurality of modules that operate in cooperation with one another.

While module 105, 110 and 115 are indicated as being already loaded into memories 104, 109 and 114, respectively, each of module 105, 110 and 115 may be configured on a storage device 130 for subsequent loading into their respective memories 104, 109 and 114. Storage device 130 is a tangible, non-transitory, computer-readable storage device that stores each of module 105, 110 and 115 thereon. Examples of storage device 130 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled to O-RU 101, and/or O-DU L1 106 and/or O-DU L2 111 via a data communications network.

Fronthaul Interface 120 is the connection link between the O-DU and O-RU carrying CUS-plane packets as well as M-plane packets.

FAPI 121 is the connection link between the O-DU L1 entity (PHY) and L2 entity (MAC), in case the L1 entity and L2 entity reside in a single physical element, the FAPI is an internal logical interface within O-DU; while in case the L1 entity and L2 entity reside in different elements, the FAPI is a logical interface over the nFAPI (network FAPI) connecting the physical elements.

System 100 supports the option implementation, which enables the calculation of UE correlation conducted within the L1 entity of O-DU and the report of SRS power, noise and interference to L2 entity.

Figure 2:
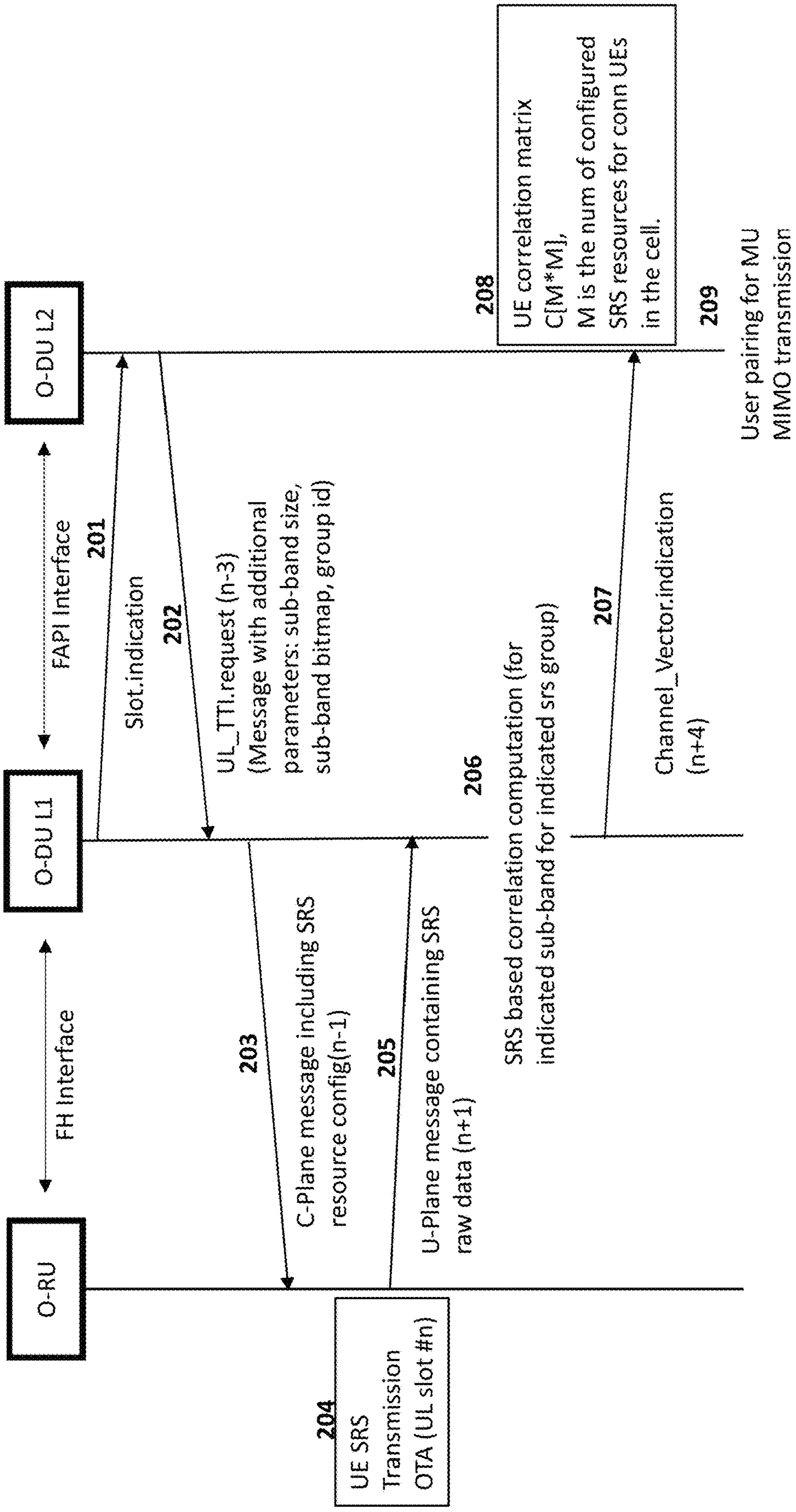
FIG. 2 shows an example TDD pattern containing Downlink, Uplink and Special slots.

FIG. 2 is a signal flow for interaction signaling flow over FH and API interfaces. The interface between O-RU and O-DU is the FH interface and carries the CUS and M plane messages. The interface between L1 and L2 entities residing in the O-DU is the SCF FAPI interface and carries the L2-L1 messages.

At block 201, the L1 sends a slot indication message to the L2. At block 202, in the UL direction, L2 sends a message UL_TTL.request to L1 in slot n−3 requesting for sub-band correlation information over the SRS resources. The message can include additional parameters such as sub-band size, sub-band bitmap, and group id. An example of parameters that can be included in a UL_TTL.request message body are shown in Table 1. At block 203, L1 sends the C-plane message to O-RU in slot n−1 requesting for SRS data. The C-plane message includes the SRS resource config (n−1). At block 204, O-RU extracts the raw SRS data, including UE SRS OTA and US slot number (#n). At block 205, the O-RU sends the raw SRS data to L1 in slot n+1. At block 206, L1 computes the SRS channel estimates and the sub-band correlation information among the channel estimates. At block 207, L1 and sends the Channel_Vector.Indication message in slot n+4 to L2. An example of parameters that can be included in a Channel_Vector.Indication message are shown in Table 2. As noted herein, the Channel_Vector.Indication can include a UE correlation matrix, where the UE correlation matrix C[M*M], M is the num of configured SRS resources for conn UEs in the cell. At block 208, L2 receives this sub-band correlation information and at block 209, L2 uses it to perform user pairing for DL and UL MU MIMO in the massive MIMO RAN over the PRBs in the corresponding sub-band. L1 can average the sub-band correlation information and use it for user pairing over the entire bandwidth as well. The slot timings explained here are exemplary—the system can be configured to execute any other variations of the timing.

The following parameters are added to the UL_TTLrequest message in the SCF 5G FAPI specification. The parameters in Table 1 in italics are parameters for sub-band correlation, examples of which can be found in International Patent Application PCT/CN2022/078545 entitled "METHOD AND INTERFACE FOR INFORMATION INTERACTION IN O-RAN" filed on Mar. 1, 2022 [2], the entirety of which is incorporated by reference hereby.

Figure 3:
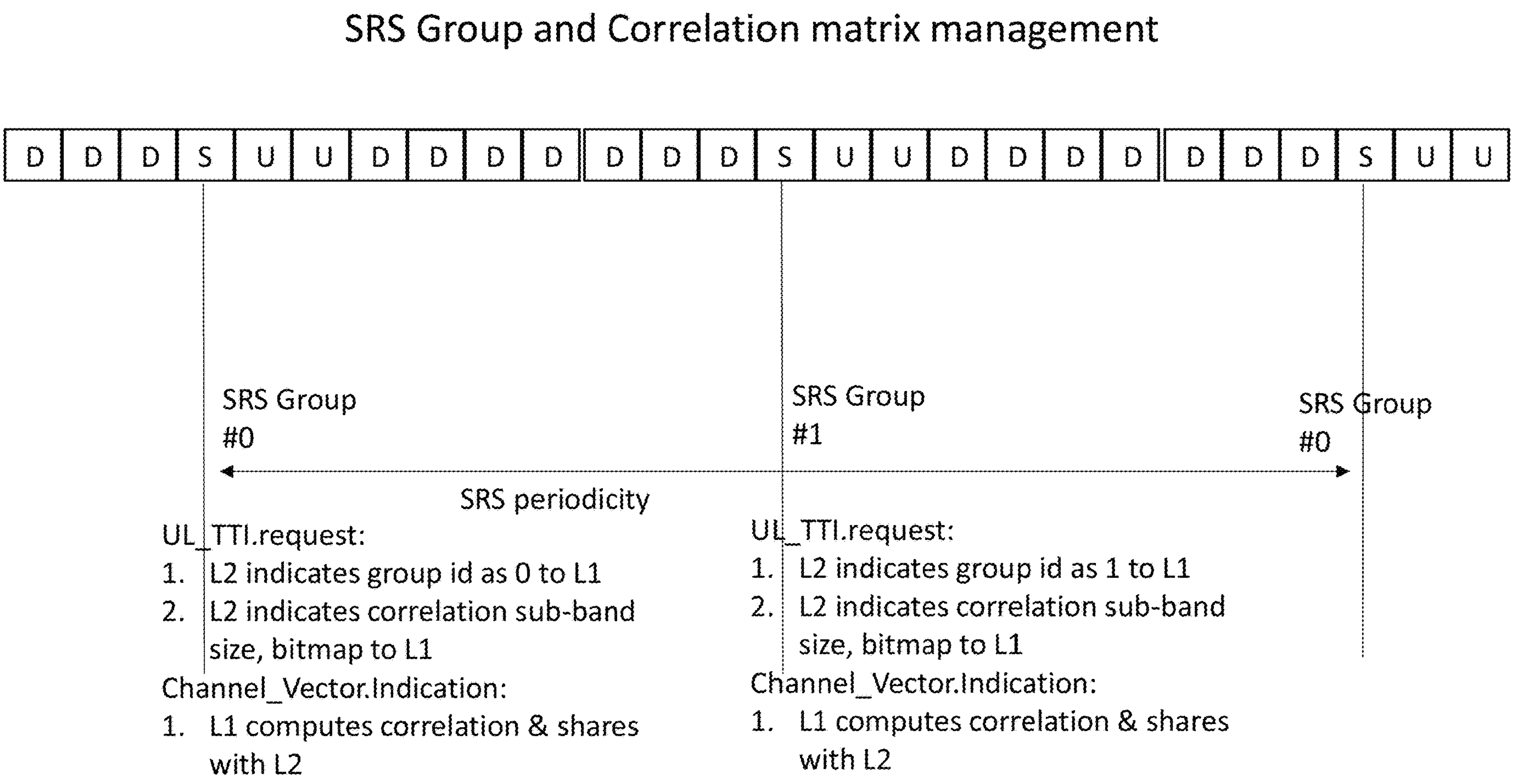
FIG. 3 shows an example of SRS Group and Correlation Matrix Management.

SubBandSize indicates the sub-band size in terms of number of PRBs over which sub-band correlation is to be performed. SubBandBitMap indicates the sub-bands over which correlation is requested. For example, if SubBandSize is programmed as 16 and SubBandBitMap as 0000_0000_0000_0000_1111_1111_1111_1111 then the correlation is to be performed over first 16 sub-bands each of size 16 PRBs. All 1s can indicate correlation over all sub-bands possible in the bandwidth. All 0s can indicate single wideband correlation is requested. GroupId indicates the SRS group over which correlation is requested. As illustrated in the example in FIG. 3, there are 2 SRS groups—the first SRS group is the collection of SRS resources in an SRS slot and the second SRS group is the collection of SRS resources in the next SRS slot and so on.

The correlation can be computed as follows:

$$C(s, i, j) = \left|\sum_k \frac{H(i, k)H^*(j, k)}{|H(i, k)||H(j, k)|}\right|$$

Where C(s,i,j) is the correlation over sub-band 's', i is the ith srs resource index, j is the jth resource index, k is the REs within sub-band 's' and H is the SRS channel vector. Instead of the absolute value (abs) of the complex quantity, abs squared can be computed to avoid square root operations.

TABLE 1

Additions to UL_TTI.request message body

| Field | Type | Description |
|---|---|---|
| . . . | . . . | . . . |
| isCorrelationReport | uint8_t | Indicates PHY whether to calculate correlation or not. Value: 1 enable; 0 disable. |
| *SubBandSize* | *uint8_t* | *Indicates the sub-band size over which sub-band correlation is to be performed* |
| *SubBandBitMap* | *uint32_t* | *Indicates the sub-bands over which correlation is requested. Value: All 0s means single wideband correlation; All 1s means all sub-bands with requested SubBandSize* |
| *GroupId* | *uint8_t* | *Indicates the SRS group id over which correlation is requested* |
| CorrelationCalc Matrix F | uint8_t[M*M] | Array of (M*M) entries of correlation flag indicating for which SRS resource pairs correlation needs to be calculated. F[i, j]: if set 1 means correlation calculation between SRS resource index i and j is needed, otherwise (set 0) not needed. M is the number of SRS resource configured for all connected UEs in the cell. If this field is absent, the PHY needs to calculate correlations for all SRS resource combination configured in the cell. This field can be present only if isCorrelationReport set 1. |

The following parameters in italics in Table 2 can be added to the Channel_Vector.indication message for reporting sub-band correlation. GroupId indicates the SRS group id over which correlation matrix is sent by L1 to L2. The entries in correlation matrix can take on values from 0 to 1 and hence can be represented using 8 bits to minimize the amount of data transfer from L1 to L2.

TABLE 2

Channel_Vector.indication message body

| Field | Type | Description |
|---|---|---|
| SFN | uint16_t | SFN Value: 0 -> 1023 |
| Slot | uint16_t | Slot Value: 0 -> 159 |
| *GroupId* | *uint8_t* | *Indicates the SRS group id over which correlation matrix is sent* |
| UE Correlation Matrix C | *uint8_t[N][M*M]* | Array of Nx(M*M) entries of correlation value between SRS resources. C[i, j] denotes the correlation value between SRS resource index i and j. N is the number of sub-bands (number of ones in SubBandBitMap parameter) over which correlation is computed. M is the number of SRS resource configured for all connected UEs in the cell. Value of C[i, j]: 0 -> 255 |

FIG. 2 shows an example TDD pattern containing Downlink, Uplink and Special slots. In this example, the TDD pattern considered is DDDSUUDDDD and SRS is scheduled in the Special slot. The SRS is shown with periodicity of 10 slots and is split into 2 groups of users that are scheduled in an alternating manner. As noted above, in the example in FIG. 2, there are 2 SRS groups—the first SRS group (SRS Group #0) is the collection of SRS resources in an SRS slot and the second SRS group (SRS Group #1) is the collection of SRS resources in the next SRS slot and so on. For the first SRS group (SRS Group #0) in the TTI.request, L2 indicates group id as 0 to L1 and L2 indicates correlation sub-band size, bitmap to LL In the Channel_Vector.Indication, L1 computes correlation and shares with L2. For the second SRS group (SRS Group #1) in the TTI.request L2 indicates group id as 1 to L1, and L2 indicates correlation sub-band size, bitmap to L1. In the Channel_Vector.Indication, L1 computes correlation and shares with L2.

It will be understood that implementations and embodiments can be implemented by computer program instructions. These program instructions can be provided to a processor to produce a machine, such that the instructions, which execute on the processor, create means for implementing the actions specified herein. The computer program instructions can be executed by a processor to cause a series of operational steps to be performed by the processor to produce a computer-implemented process such that the instructions, which execute on the processor to provide steps for implementing the actions specified. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. The foregoing examples should not be construed as limiting and/or exhaustive, but rather, an illustrative use case to show an implementation of at least one of the various embodiments.

The invention claimed is:

1. A method for a FAPI interface in an O-RAN system comprising:
- an OPEN-RAN Radio Unit (O-RU);
- an OPEN-RAN Distributed Unit (O-DU);
- the method comprising;
  - requesting, by an O-DU L2 layer, a transmission time interval (TTI) request message for sub-band correlation information over Sounding Reference Signal (SRS) resources, the sub-band correlation information including a sub-band bitmap parameter, and a sub-band size for the sub-band correlation information, from an O-DU L1 layer; and
  - sending, by the O-DU L1 layer, the sub-band correlation information computed over the SRS resources to the O-DU L2 layer, wherein the sub-band correlation information includes a User Equipment (UE) correlation matrix C[M*M], M being a number of configured SRS resources for connected UEs in a cell.

2. The method of claim 1, further comprising:
- sending the sub-band correlation information as an array for all requested correlation over all the sub-bands indicated in the sub-band bitmap parameter in a single message.

3. The method of claim 1, further comprising the O-DU L2 layer being configured to use the sub-band correlation information to perform a user pairing for Multi-user, multiple-input, multiple-output (MU MIMO) transmission over Physical Resource Blocks (PRBs) of the corresponding sub-band.

4. The method of claim 1, further comprising:
- sending, by the O-DU L1 layer, a slot indication message to the O-DU L2 layer.

5. The method of claim 1, further comprising:
- sending, by the O-DU L2 layer, the TTI request message further comprising a GroupId parameter.

6. The method of claim 1, further comprising:
- sending, by the O DU L1 layer, a C-plane message to the O-RU requesting for SRS data.

7. The method of claim 6, further comprising:
- extracting, by the O-RU, raw SRS data, including a User Equipment (UE) SRS Over The Air (OTA) and UE slot number (#n); and
- sending, by the O-RU, the raw SRS data to the O DU L1 layer in slot n+1.

8. The method of claim 7, further comprising:
- computing, by the O-DU L1 layer, SRS channel estimates and the sub-band correlation information for the SRS channel estimates.

9. The method of claim 8, further comprising:
- sending, by the O-DU L1 layer, a Channel Vector Indication message in slot n+4 to the O DU L2 layer, the Channel Vector Indication message including the UE correlation matrix.

10. The method of claim 9, further comprising:
- receiving, at the O-DU L2 layer, the UE correlation matrix; and
- executing, at the O-DU L2 layer, user pairing for a downlink (DL) MU MIMO and uplink (UL) MU MIMO in the massive MIMO RAN over Physical Resource Blocks (PRBs) in a corresponding sub-band.

11. The method of claim 2, further comprising: the O-DU L2 layer being configured to use the sub-band correlation information to perform a user pairing for MU MIMO transmission over Physical Resource Blocks (PRBs) of a corresponding sub-band.

12. A method for an O-DU functional application platform interface (FAPI) comprising:
- requesting, by an O-DU L2 layer, a sub band correlation information for a group of Sounding Reference Signal (SRS) resources in a time instance and one or more other groups of SRS resources in another time instance with a GroupId parameter, wherein the sub-band correlation information includes a User Equipment (UE) correlation matrix C[M*M], M being a number of configured SRS resources for connected UEs in a cell.

13. The method of claim 12, further comprising: sending the sub-band correlation information as an array for all requested correlations over all sub-bands as indicated in a sub-band bitmap parameter in a single message.

14. The method of claim 12, further comprising:
- performing, by the O-DU L2 layer, a user pairing for a Multiple User Multiple Input Multiple Output (MU MIMO) transmission over Physical Resource Blocks (PRBs) of a corresponding sub band based on the sub-band correlation information.

15. The method of claim 13, further comprising performing, by the O-DU L2 layer, a user pairing for a Multiple User Multiple Input Multiple Output (MU MIMO) transmission over Physical Resource Blocks (PRBs) of a corresponding sub band based on the sub-band correlation information.

16. An O-RAN system comprising:

an OPEN-RAN Distributed Unit O-DU comprising an O-DU L1 layer, an O-DU L2 layer, and a functional application platform interface (FAPI) therebetween;

the O-DU L2 layer being configured to request a transmission time interval (TTI) request message from the O-DU L1 layer for sub-band correlation information over Sounding Reference Signal (SRS) resources, the sub-band correlation information including a sub-band bitmap parameter, and a sub-band size for the sub-band correlation information; and the O-DU L1 layer being configured to compute and send the sub-band correlation information computed over the SRS resources to the O-DU L2 layer, wherein the sub-band correlation information includes a User Equipment (UE) correlation matrix C[M*M], M being a number of configured SRS resources for connected UEs in a cell.

17. The system of claim 16, further comprising:

the O-DU L1 layer being configured to send the sub-band correlation information from as an array for all requested correlation over all the sub-bands indicated in the sub-band bitmap parameter in a single message.

18. The system of claim 16, further comprising: the O-DU L2 layer being configured to use the sub-band correlation information to perform a user pairing for MU MIMO transmission over Physical Resource Blocks (PRBs) of the corresponding sub-band.

19. The system of claim 16, further comprising: the O-DU L2 layer being configured to request the sub band correlation information for a group of SRS resources in a time instance and one or more other groups of SRS resources in another time instance with a GroupId parameter.

* * * * *